United States Patent
Newman et al.

(10) Patent No.: US 8,489,887 B1
(45) Date of Patent: Jul. 16, 2013

(54) BIOMETRIC AUTHENTICATION FOR VIDEO COMMUNICATION SESSIONS

(75) Inventors: Kurt D. Newman, Matthews, NC (US); Debashis Ghosh, Charlotte, NC (US); Michael James O'Hagan, Charlotte, NC (US); David Joa, Pacifica, CA (US); Timothy J. Bendel, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1233 days.

(21) Appl. No.: 12/347,838

(22) Filed: Dec. 31, 2008

(51) Int. Cl.
*G06F 21/00* (2006.01)

(52) U.S. Cl.
USPC ........ 713/182; 726/2; 726/4; 726/17; 726/19; 726/21; 726/22; 726/7; 713/168; 713/176; 713/186; 725/112; 725/136; 379/202.01

(58) Field of Classification Search
USPC .................. 713/168, 176, 182, 186; 726/2, 4, 726/7, 17, 19, 21, 22; 348/14.08, 143; 707/737; 725/112, 136; 379/202.01
See application file for complete search history.

(56) References Cited

U.S. PATENT DOCUMENTS

| 6,688,891 B1 | 2/2004 | Sanford |
| 7,920,158 B1 * | 4/2011 | Beck et al. ................. 348/14.08 |
| 2007/0188593 A1 | 8/2007 | Min |
| 2007/0263824 A1 * | 11/2007 | Bangalore et al. ....... 379/202.01 |
| 2008/0031590 A1 | 2/2008 | Kulas |
| 2008/0046956 A1 * | 2/2008 | Kulas ........................... 725/136 |
| 2010/0125580 A1 * | 5/2010 | Westen et al. ................. 707/737 |

FOREIGN PATENT DOCUMENTS

| WO | 03042955 A1 | 5/2003 |
| WO | 03103217 A1 | 12/2003 |

* cited by examiner

*Primary Examiner* — Thanhnga B Truong
(74) *Attorney, Agent, or Firm* — Banner & Witcoff, Ltd.; Michael A. Springs

(57) ABSTRACT

Systems and methods for integrating biometric authentication with video conference sessions are described. An individual seeking to participate in a video conference may first be identified with a biometric parameter such as an iris scan based on a comparison of the scanned iris with a database of stored parameters. If authorized, the system may connect the individual to the video session. In addition, the system may generate dynamic tags that allow the participants to identify and locate individuals in the video conference. For example, if one of the participants is speaking and moving within the room, her tag may change color and move with her on the video screen.

19 Claims, 9 Drawing Sheets

BIOMETRIC AUTHENTICATION FOR VIDEO COMMUNICATION SESSIONS

BACKGROUND

Ensuring that adequate authentication measures are present for participating in video conferences is one consideration for many entities providing products and services. Proper authentication systems may ensure that individuals are identified with confidence so participants may know exactly who he/she is conversing with during the conference.

Traditionally, access to video conferences associated with an entity has been regulated by very limited authentication protocols. Once an individual has gained access to the main entrance of a facility associated with an entity, access to meeting and conference rooms within the facility may have been regulated by no additional authentication procedures or other security measures.

Limited authentication measures that have been employed include traditional keys and access cards to enter a conference room. However, these security measures do not allow identification of an individual with high confidence. For instance, someone other than the intended individual may gain possession of the door key or the access card and enter the conference or meeting without raising any suspicion on the part of others. In addition to traditional access credentials such as access cards and keys, other types of facility access systems utilizing biometric recognition also exist.

In general, entities may need to have proper authentication measures to ensure that people may be properly identified and authorized to participate in video conferences, particularly when classified or confidential material may be discussed. This identification and authorization may be required to guard against fraud, protect customer information, and prevent unauthorized identity use.

Current systems for video conferencing might have static placards indicating the various locations of the participants in the video conference or they may have the location of each participant on the TV monitor itself. But video conferences may often be very dynamic events, with different people speaking in succession or simultaneously and moving about to serve different purposes that may not be adequately represented by current systems.

FIG. 3a illustrates a conventional method for conducting authentication associated with a video conference. At step 301a, an entity has an alarm system that may be activated. At step 303a, an individual who seeks entry into the facility represented by the entity may present access credentials. These credentials traditionally have included keys and access cards. The individual may be identified in step 305a, and the system may make a decision as to whether the credentials are valid in step 307a. If they are valid, then the security system may deactivate and access may be granted in step 311a. Meanwhile, if the credentials are invalid, then access may be denied in step 309a. Once the individual gains entry to the facility, she generally may access all video conference rooms within the facility in step 313a.

FIG. 3b illustrates another conventional method for conducting a video conference. At step 301b, an entity has an alarm system that may be activated. At step 303b, an individual who seeks entry into the facility represented by the entity may present access credentials. The individual may be identified based on these credentials at step 305b, and the system then may decide whether the individual presents valid access credentials in step 307b. If she does not, then access may be denied in step 309b. If she does, the individual may be permitted entry into the entity in step 311b. If a video conference is scheduled, an individual may present access credentials again to enter the conference room or participate in the conference via the conferencing system in step 313b. These credentials may be the same as the credentials used to enter the facility or they may be different. Again, the individual may be identified based on the credentials in step 315b, and the system then may decide whether the individual presents valid access credentials in step 317b. If she does not, then access may be denied in step 319b. If she does, the individual may be permitted access to the meeting resources in step 321b. Once the individual is authorized, the video conference may be conducted with participants from multiple locations in step 323b. In this step the conference may be conducted with limited information about the physical locations and identities of each of the participants within the conference areas. Static location and identity placards may be placed alerting the participants of location and personal identification information. Finally, in step 325b, the video conference may be concluded and the method may proceed back either to step 313b or step 301b based on whether the identified individual is still within the facility.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present disclosure are directed to a method and system for a new biometric authentication system for video conferencing.

In providing access to a video conference, aspects of the present disclosure recognize and use various storage databases and repositories for handling biometric identification parameters.

Another aspect of the present disclosure is directed to methods and systems for dynamically tagging and identifying an individual as a video conference is underway.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
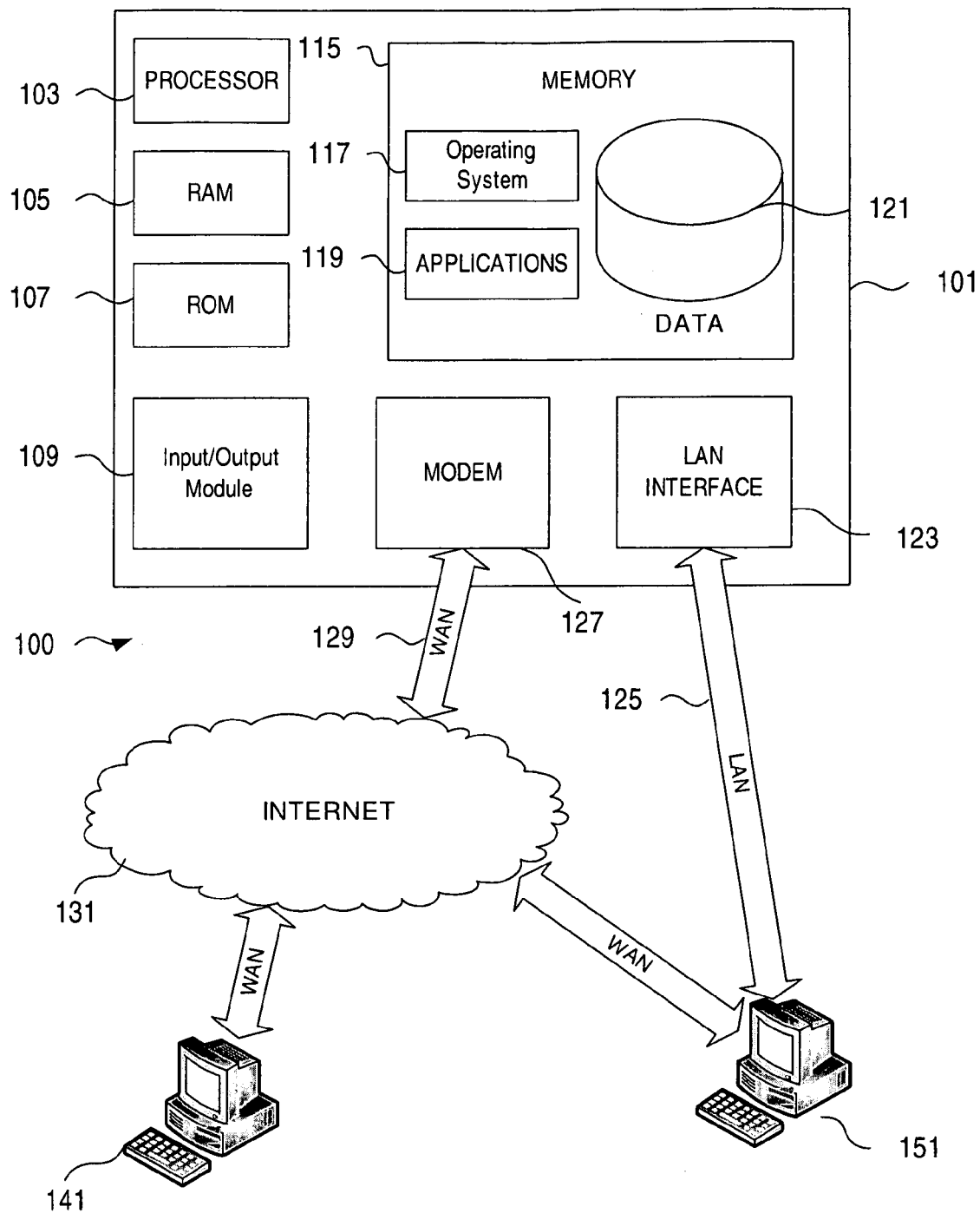
FIG. 1 illustrates a schematic diagram of a general-purpose digital computing environment in which certain aspects of the present disclosure may be implemented.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with individuals, allowing interoperability between different elements of the business residing at different physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the server 101 according to an illustrative embodiment of the disclosure may include computer executable instructions for invoking functionality related to providing access authorization for facilities and networks.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
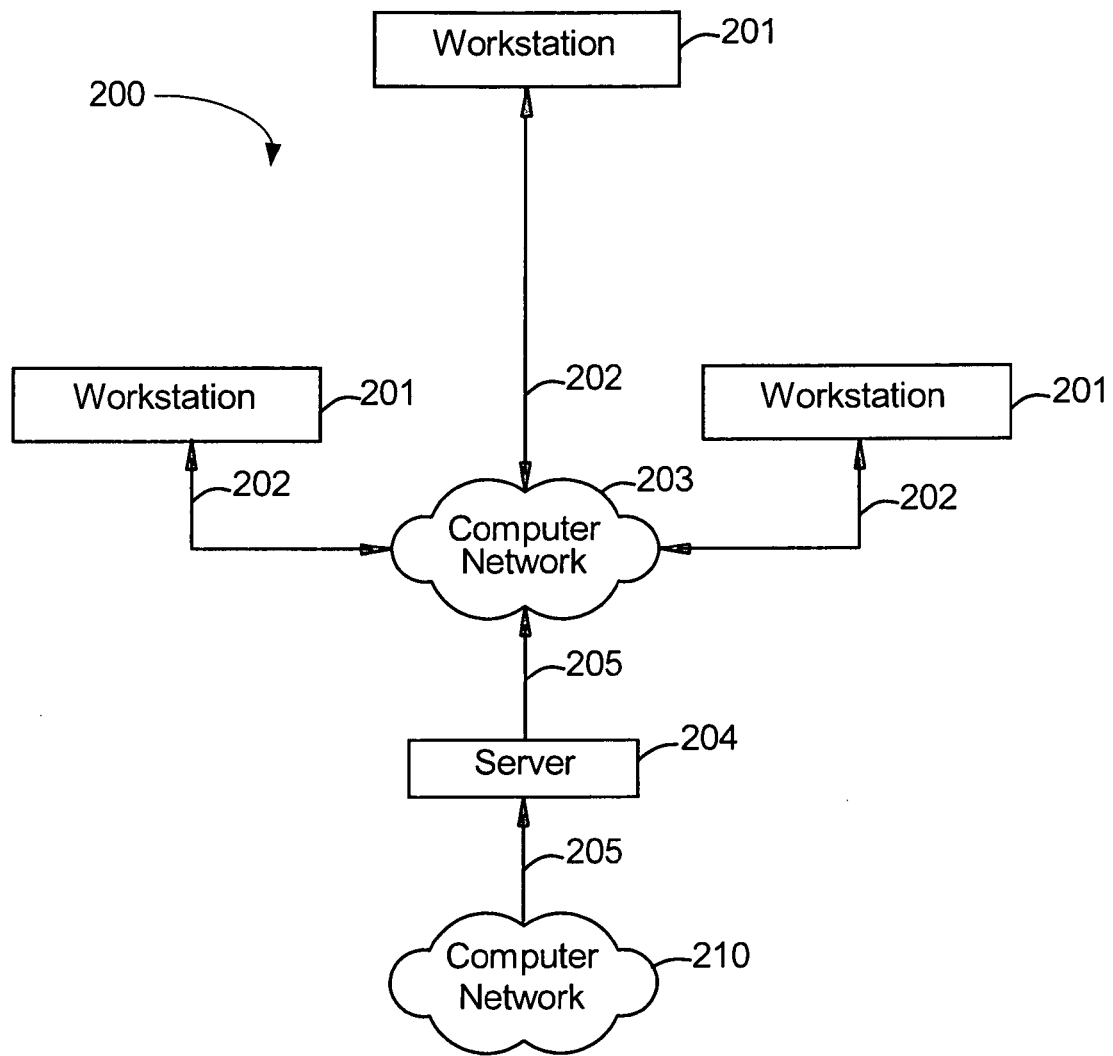
FIG. 2 is an illustrative block diagram of workstations and servers that may be used to implement the processes and functions of certain embodiments of the present disclosure.
Figure 3A:
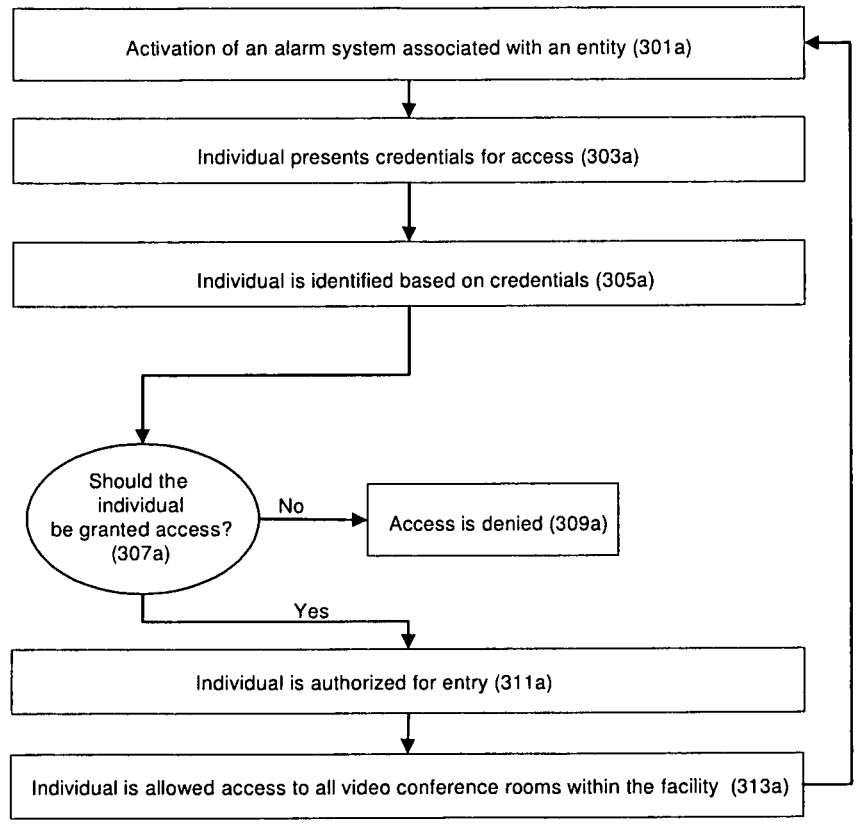
FIG. 3a is an example conventional video conferencing system without any video conferencing authentication protocols in place.
Figure 3B:
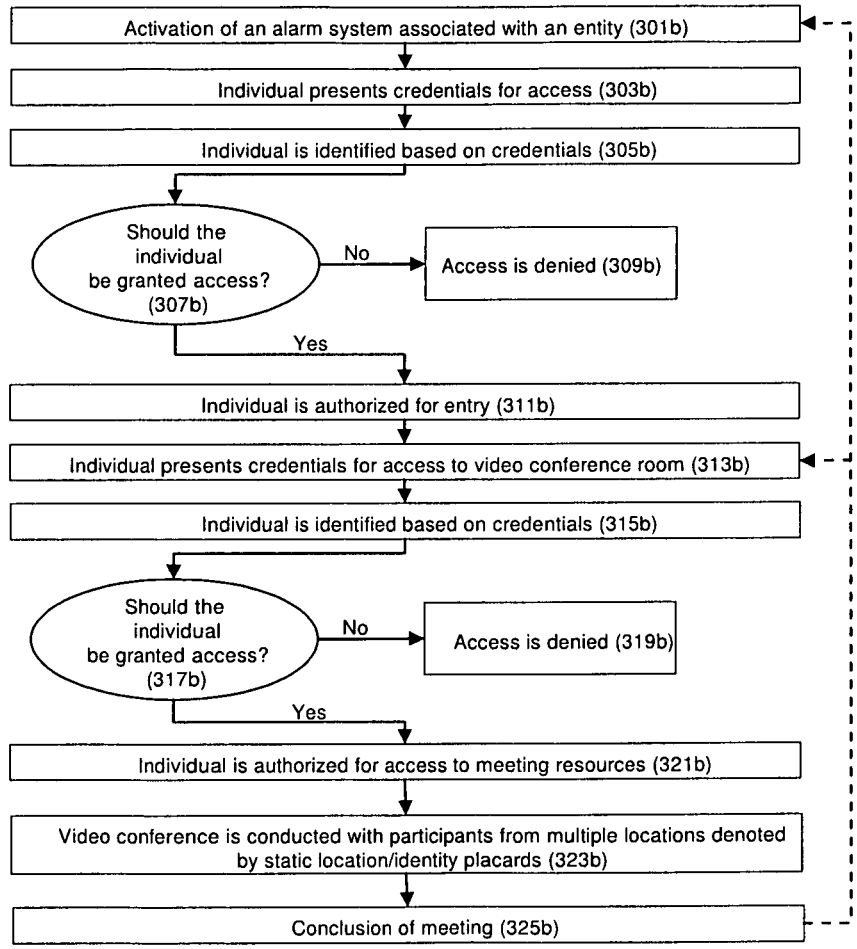
FIG. 3b is an example conventional video conferencing system with room access authorization and procedures in place for the conduct of the conference.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

The steps that follow in the Figures may be implemented by one or more of the components in FIGS. 1 and 2 and/or other components, including other computing devices.

Figure 4:
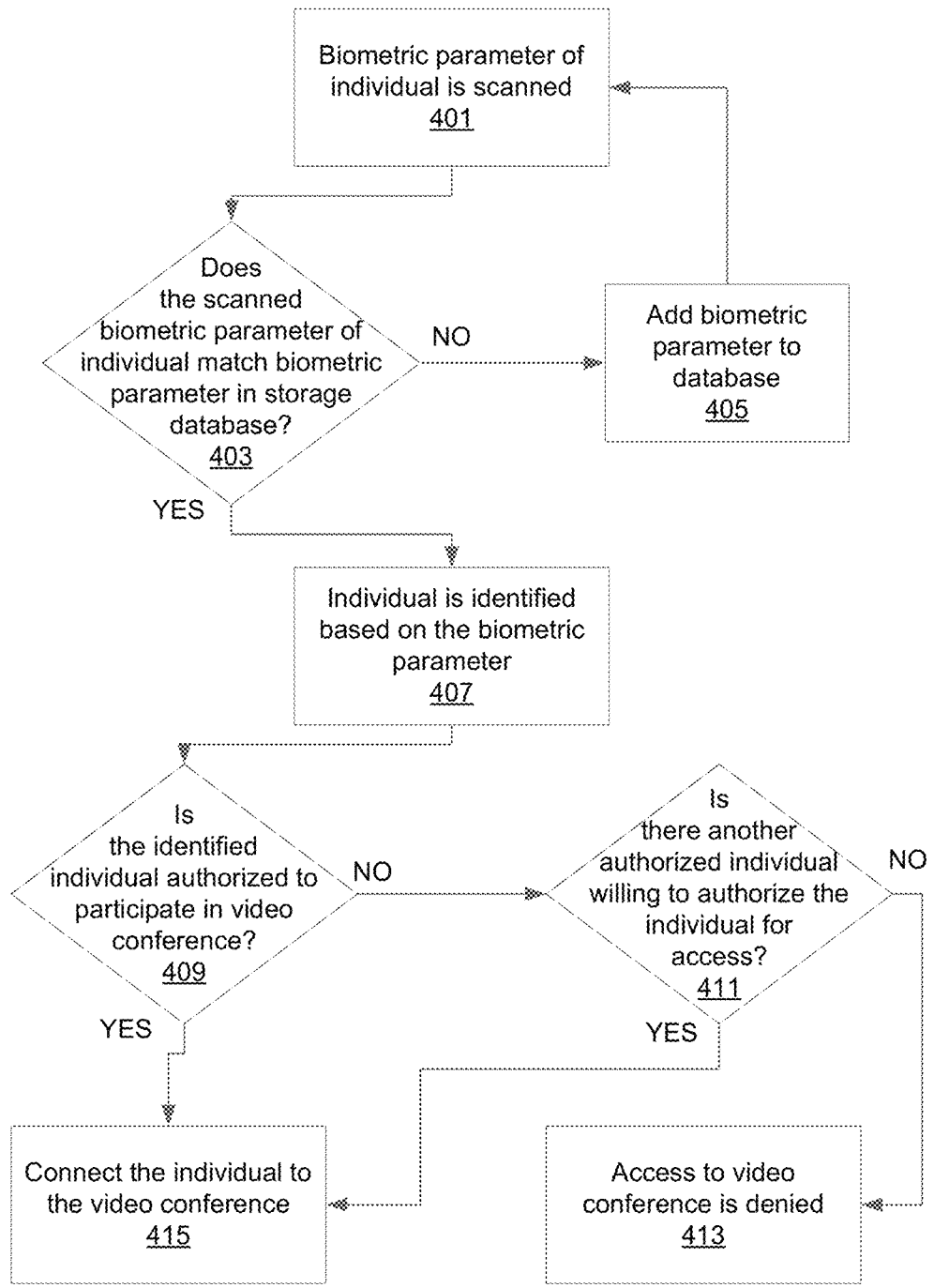
FIG. 4 is a flowchart of an illustrative method for biometric authorization integrated with video conferencing in accordance with at least one aspect of the present disclosure.

FIG. 4 is a flowchart of an illustrative method for biometric authentication of a video conference session in accordance with at least one aspect of the present disclosure. In step 401, a biometric parameter of an individual may be scanned. This biometric parameter may include a host of biomarkers such as the iris, retina, fingerprints, and/or face recognition. In step 403, this scanned biometric parameter may be compared to the biometric parameters stored in a database. This database may be populated with any one of or all of the different varieties of biometric parameters. It may also be located either with the scanning unit or remotely from this unit. If the parameter scanned does not match any of the parameters already in the database, the parameter may be added to the database in step 405 and then the process may go back to step 401. If the parameter is matched, the individual may be identified based on the parameter in step 407. Then the process may move to step 409 where a decision may be made as to whether the identified individual is authorized to participate in the video conference. If she is not authorized, then the process may move to a second decision step 411 where a decision may be made as to whether there is an authorized individual who is willing to authorize the identified individual access to the video conference. This authorization may be made by a person who has already entered the conference room or by someone else who may be authorized but may not have decided to attend the video conference. This determination may be done on the spot if the authorized individual is present at the video conference by a wide variety of methods, including rescanning her iris to allow the unauthorized individual to access the video conference. Alternately, if the authorized individual who may vouch for the unauthorized but identified individual is not present at the video conference, the system may contact the authorized individual through a plurality of methods, including via telephone, email or announcements over the intercom. If there is no one to vouch for the identified but unauthorized individual, access to the video conference may be denied in step 413. Finally, if the identified individual is authorized to access the video conference either through the authorization of her own biometric parameter or through authorization from another authorized individual, she may be connected to the video conference in step 415.

As an example, consider a case where several attorneys along with a client at a law firm in Boston may need to speak with a new client representative in San Francisco via a video conference. Since the client representative is in a remote location, the law firm may implement a biometric authentication procedure to authenticate participation in the conference. As such, the client representative may have her fingerprints digitally scanned. The system may determine if the fingerprints match those in a remote and/or local fingerprint storage database. If the client representative is who she claims to be, the fingerprints are matched to those found in the storage database, she is accurately identified, and she is authorized to connect to the video conference. In this way, a "one-sided" biometrically authenticated video conference may be conducted. Alternatively, it should be noted that "two-sided" or "multi-sided" biometrically authenticated video sessions may also be conducted if all parties involved at different locations need to be authenticated.

Figure 5:
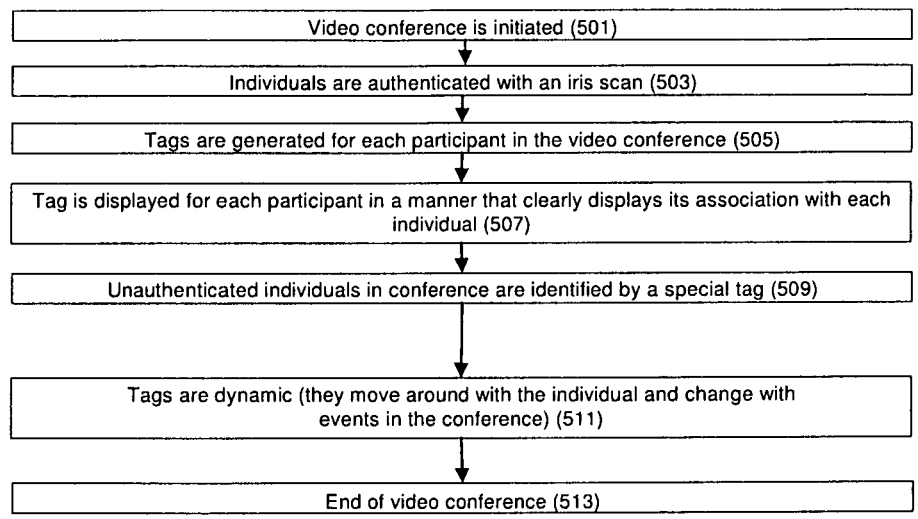
FIG. 5 is a flowchart of an illustrative method for dynamically tagging individuals during the progress of a video conference in accordance with at least one aspect of the present disclosure.

FIG. 5 is a flowchart of an illustrative method for using dynamic tags in accordance with at least one aspect of the present disclosure. In step 501, a video conference may be initiated. Then the process may move to step 503 where the participants in the conference are authenticated with an iris scan. It should be noted that any number of biometric authentication procedures may also be employed, including face recognition, retinal scans, and fingerprint identification. Then the process may move to step 505 where tags may be generated for each participant in the video conference.

Tags may exist in many forms. In one embodiment, a tag may simply be the name of the individual who is participating in the conference. In other examples, a tag may be an individual's title at an entity, her functional role associated with the entity, a nickname used to identify her, or any number of other descriptors.

Going back to FIG. 5, the method then may move to step 507 where, once generated, the tags may be displayed for each participant in a manner that clearly displays their association with each individual. For instance, the tag may be placed directly over the head of each individual, or there may be a number placed over the head with a corresponding legend to the side of the video screen that denotes who is represented by each number. Then in step 509, unauthorized individuals in the conference may be identified by a special tag. This tag may take many forms, including a question mark or a series of dashed lines. In other examples, unauthorized individuals may not be identified with any tag.

Then in step 511, tags may move around with the individual as the video conference proceeds. The tags in general may be very dynamic and may change with events that occur within a conference.

An event may be any incident that occurs during the course of the video conference that causes a need for drawing attention to an individual or a movement of an individual from one place to another. For instance, an event might be that one individual is talking while others are listening. In this case, the tag identifying the speaker might change color, become larger in font size, change font type, make some type of animation, glow in the dark, and/or any of a number of other types of changes to differentiate her role as speaker. Alternatively, an individual might decide to move from one seat at a conference table to another. In this case, a tag associated with the individual might move with the individual from one chair to the next over her head as she is moving. In yet another example, two different individuals might be speaking. Both individuals in this case might have tags with a color that distinguishes the fact that they are talking. Going back to FIG. 5, finally in step 513, the video conference may be concluded.

Figure 6:
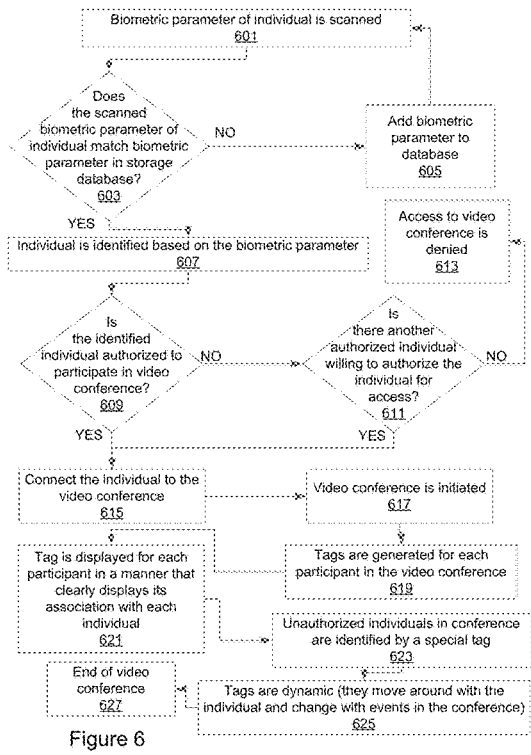
FIG. 6 is a flowchart of an illustrative method for integrating biometric authentication, dynamic tagging, and video conferencing in accordance with at least one aspect of the present disclosure.

FIG. 6 is a flowchart of an illustrative method for combining biometric authentication and dynamic tagging during video conference sessions. In step 601, a biometric parameter of an individual may be scanned. This biometric parameter may include a host of biomarkers such as the iris, retina, fingerprints, or face recognition. In step 603, this scanned biometric parameter may be compared to the biometric parameters stored in a database. This database may be populated with any one of or all of the different varieties of biometric parameters. It may also be located either with the scanning unit or remotely from that unit. If the parameter scan does not match any of the parameters already in the database, the parameter may be added to the database in step 605. If the parameter is matched, the individual may be identified based on the parameter in step 607. Also, after adding the parameter of a new individual to the database, the process may move to step 607. Then the process may move to step 609 where a decision may be made as to whether the identified individual is authorized to participate in a video conference. If she is not authorized, then the process may move to a second decision step 611 where a decision may be made as to whether there is an authorized individual who is willing to authorize the identified individual access to the video conference. This authorization may be made by a person who has already entered the conference room or by someone else who may be authorized but may not have decided to attend the video conference. This determination may be done on the spot if the authorized individual is present at the video conference by a wide variety of methods, including rescanning her iris to allow the unauthorized individual to access the video conference. Alternately, if the authorized individual who may vouch for the unauthorized but identified individual is not present at the video conference, the system may contact the authorized individual through a plurality of methods, including via telephone, email or announcements over the intercom. If there is no one to vouch for the identified but unauthorized individual, access to the video conference may be denied in step 613. Finally, if the identified individual is authorized to access the video conference either through the authorization of her own biometric parameter or through authorization from another authorized individual, she may be connected to the video conference in step 615. Then in step 617, a video conference may be initiated. Next, the process may move to step 619 where tags may be generated for each participant in the video conference.

The method may then move to step 621 where, once generated, the tags may be displayed for each participant in a manner that clearly displays their association with each individual. For instance, the tag may be placed directly over the head of each individual, or there may be a number placed over the head with a corresponding legend to the side of the video screen that denotes who is represented by each number. Then in step 623, unauthorized individuals in the conference may be identified by a special tag. This tag can take many forms, including a question mark or a series of dashed lines. In other examples, unauthorized individuals may not be identified with any tag.

Unauthorized individuals may come inside the room by accident during the course of the meeting. For instance, one of the authorized participant's secretaries may need to interrupt the video conference to relay a message to the participant. In that case, the secretary may appear on the video monitor with a question mark over her head since she may not be authorized to enter the room. In other examples, unauthorized persons might not even be able to enter the video conference area. In yet other examples, the video screen may turn black once the system determines that an unauthorized individual has entered the video conference area and come back on when the individual has left. In still yet other examples, the audio system may turn off when an unauthorized individual has entered the video conference area and come back on when the individual has left. In addition, the audio and video systems may both turn off and, rather than turn back on after the individual has left, they may stay off permanently.

Going back to FIG. 6, in step 625, tags may move around with the individual as the video conference proceeds. The tags in general may be very dynamic and may change with any events that occur within a conference. Finally in step 627, the video conference may be concluded.

As an example, consider a nationwide car manufacturer with three corporate offices in Chicago, San Francisco, and Detroit. Assume that a video conference is scheduled for the managers located at each office, and that there are nine total participants, two in Chicago, three in Boston, and four in Detroit. The manager at each location may enter a video conference room already equipped with audiovisual capabilities. Once they enter the room, a video camera located in one corner of the room may scan their iris and compare the scanned iris with the parameters stored in a database located at the corporate headquarters in one of the locations involved in the video conference. Alternatively, the iris scan may be performed before the managers enter the video conference room to authorize access to the room and to the video conference simultaneously.

Once the iris scan is made, if there is a match between the scanned iris and the stored iris, the managers may be identified and a determination may be made as to whether the managers are authorized to participate in the meeting. If there is no match between a stored iris scan and the currently scanned iris, the currently scanned iris may be added to the storage database, and a comparison may again be made between a list of authorized managers and the newly added manager. If authorized, the managers may be connected to the video conference and allowed to participate via the audiovisual equipment. If the individual is not authorized, the system may take some sort of action, such as not activating the microphone of the unauthorized manager. Alternatively, a message may be given that an unauthorized individual has entered the video conference area. In other examples, one of the other authorized participants may override the system so that the unauthorized individual is given full access to the video conference.

Once all of the authorized managers have been connected to the video conference, name tags may be generated for each individual at the video conference. The name tag may be directly displayed over the heads of the managers on the video screen in standard black font so that their faces are obstructed as little as possible.

Assume also that one of the managers in the Chicago office must start out the video conference with an update on the current financial health of the car manufacturer. In this case, her name tag may switch to red to highlight that she needs to command everyone's attention. If one of the other managers in the Detroit office interrupts her to ask a question, this Detroit manager may have her tag double in size as a result of the dialogue that she is causing with the speaker. During this exchange, if one of the San Francisco managers decides to take advantage of a cup of coffee located in the opposite corner of the conference room, her tag may move along with her to the coffee machine and back with her to her seat after picking up a cup.

At the end of the video conference, if there are multiple conversations taking place, the system may color-code the tags such that those managers speaking with one another have the same color. It should be noted that any number of other tag modifications can be made using this technique.

Figure 7A:
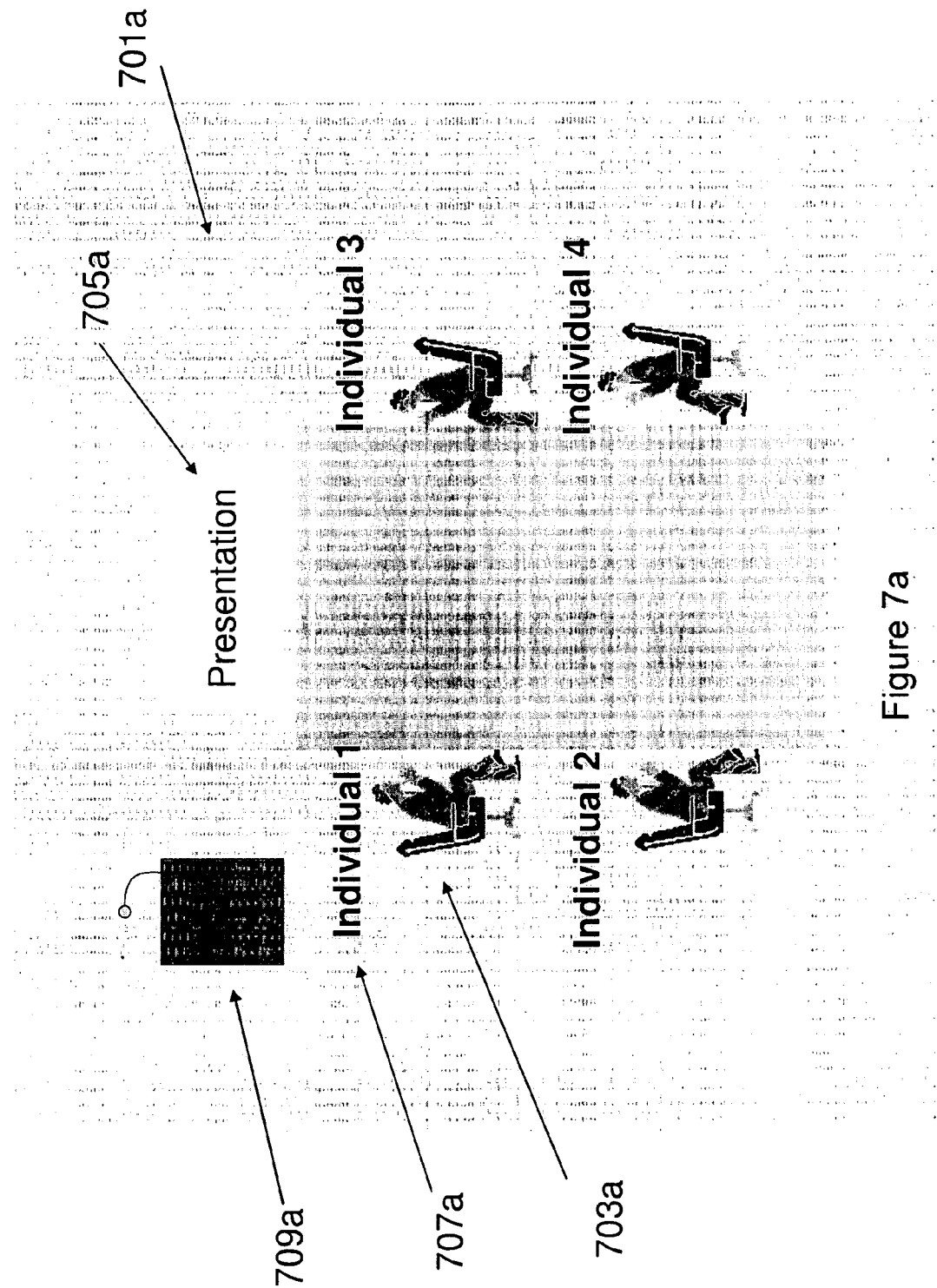
FIG. 7a is an illustrative schematic diagram of a video conference display screen, which integrates dynamic tagging, and depicts a conference that has just begun in accordance with at least one aspect of the present disclosure.

FIG. 7a is an illustrative schematic of a video conference display screen with dynamic tagging. The video conference display screen 701a shows four individuals sitting at a conference room table. One of these individuals, individual 1, is sitting at location 703a. The tag associated with individual 1 is located over his head at location 707a. There is a presentation screen in front of the desk at location 705a. The speaker's podium at location 709a may be initially empty as shown in FIG. 7a.

Figure 7B:
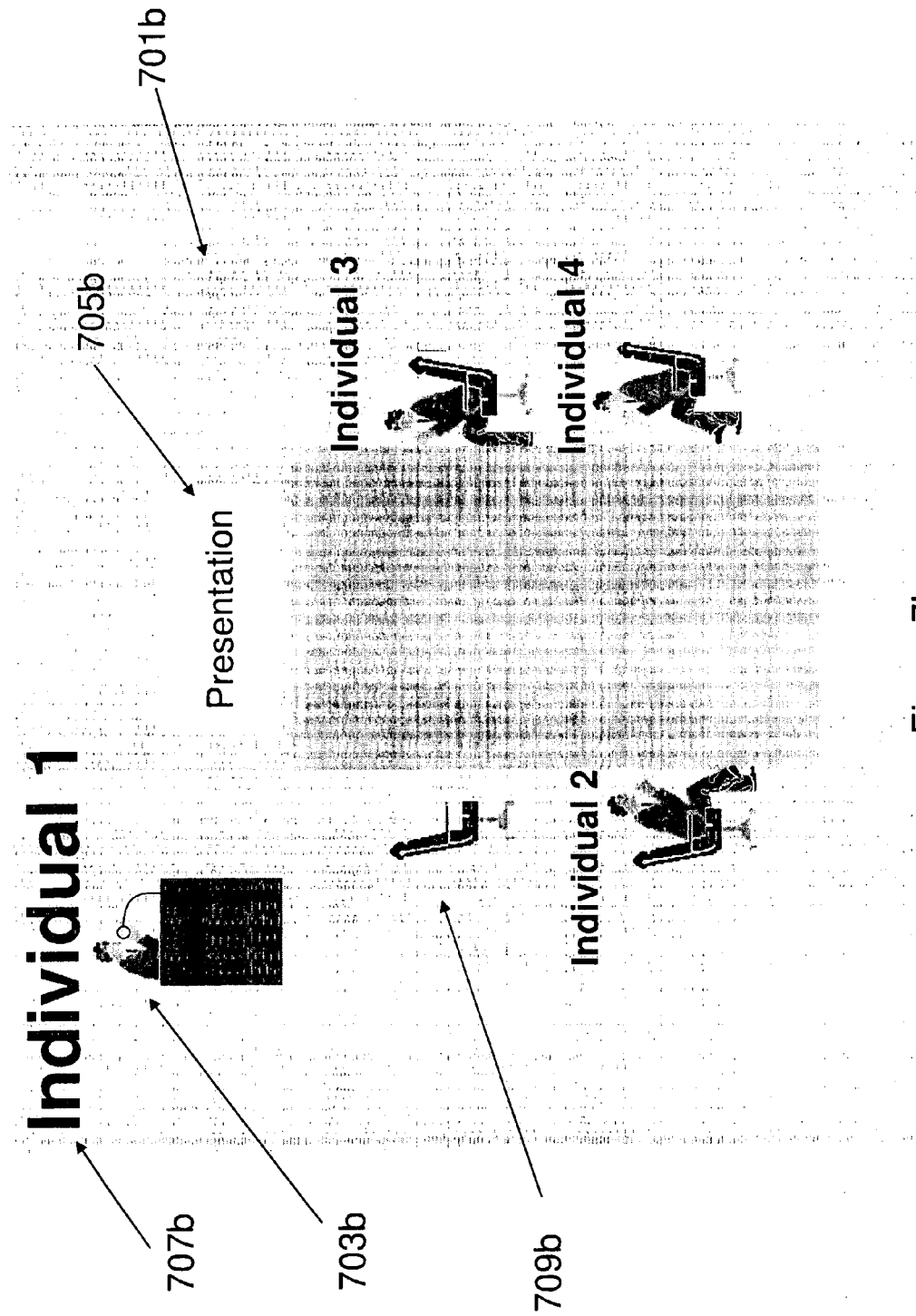
FIG. 7b is an illustrative schematic diagram of a video conference display screen, which integrates dynamic tagging, at different time point from the visual of FIG. 7a in accordance with at least one aspect of the present disclosure.

FIG. 7b is an illustrative schematic of a video conference display screen with dynamic tagging that reflects a time different from the one shown in FIG. 7a. At this particular time, the video display screen 701b of the video conference system shows only three individuals sitting at the conference room table. Individual 1 has left his seat at location 709b and is now at location 703b in front of the podium. He may be giving a speech and referring to the presentation at location 705b. Since he is talking, the tag at location 707b identifying individual 1 may now be bigger and bolder, as shown in FIG. 7b.

While illustrative systems and methods as described herein embodying various aspects of the present disclosure are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present invention.

What is claimed is:

1. A method comprising:
generating a displayable tag dynamically associated with an identified individual in a video conference;
displaying on a video conferencing screen the tag associated with the identified individual;
changing the tag when an event occurs with regard to the identified individual, wherein the displayed tag has a first size when the identified individual is detecting talking during a video conference and the displayed tag has a second size when the identified individual is detected not talking during the video conference; wherein the first size is larger than the second size; and the event being a change in the detected state of talking of the identified individual;
determining whether a plurality of individuals are speaking at a same time during the video conference; and in response to determining whether the plurality of individuals are speaking at the same time, changing the tags of the plurality of individuals to a same color.

2. The method of claim 1, wherein the displaying of the tag is one-sided.

3. The method of claim 1, wherein the displaying of the tag is multi-sided.

4. The method of claim 1, wherein the tag is displayed over the head of the identified individual.

5. The method of claim 1, wherein the displayed tag moves on the video conferencing screen with the individual when the individual moves.

6. The method of claim 1, wherein unauthorized individuals are identified by a special tag.

7. The method of claim 1, wherein the displayed tag changes color when the identified individual is talking.

8. The method of claim 1, wherein the displayed tag is the name of the identified individual.

9. The method of claim 1, wherein the event is an occurrence of a plurality of individuals speaking at a same time during the video conference, the method further comprising changing each of the tags of the plurality of individuals to a common tag.

10. An apparatus comprising:
at least one processor;
a memory having stored therein computer executable instructions, that when executed by the at least one processor, cause the apparatus to:
generate a displayable tag dynamically associated with an identified individual in a video conference;
display on a video conferencing screen the tag associated with the identified individual;
change the tag responsive to an event occurring with regard to the identified individual, wherein the displayed tag has a first size when the identified individual is detecting talking during a video conference and the displayed tag has a second size when the identified individual is detected not talking during the video conference; wherein the first size is larger than the second size; and the event being a change in the detected talking state of the identified individual;
determine whether a plurality of individuals are speaking at a same time during the video conference; and in response to determining whether the plurality of individuals are speaking at the same time, change the tags of the plurality of individuals to a same color.

11. The apparatus of claim 10, wherein the tag is displayed over the head of the identified individual.

12. The apparatus of claim 10, wherein the displayed tag moves on the video conferencing screen with the individual when the individual moves.

13. The apparatus of claim 10, wherein the displayed tag changes color when the identified individual is talking.

14. One or more non-transitory computer-readable medium storing computer-executable instructions, that when executed on a computing device, cause the computing device to:
generate a tag associated with an identified individual in a video conference;
display on a video conferencing screen the tag associated with the identified individual;
change the tag when an event occurs with regard to the identified individual, wherein the displayed tag has a first size when the identified individual is detecting talking during a video conference and the displayed tag has a second size when the identified individual is detected not talking during the video conference; wherein the first size is larger than the second size; and the event being a change in the detected state of talking of the identified individual;
determine whether a plurality of individuals are speaking at a same time during the video conference; and in response to determining whether the plurality of individuals are speaking at the same time, change the tags of the plurality of individuals to a same color.

15. The one or more computer-readable medium of claim 14, wherein the tag is displayed over the head of the identified individual.

16. The one or more computer-readable medium of claim 14, wherein the displayed tag moves on the video conferencing screen with the individual when the individual moves.

17. The one or more computer-readable medium of claim 14, wherein the displayed tag changes color when the identified individual is talking.

18. An apparatus comprising:
at least one processor;
a memory having stored therein computer executable instructions, that when executed by the at least one processor, cause the apparatus to:
generate a tag associated with an identified individual in a video conference;
display on a video conferencing screen the tag associated with the identified individual;
change the tag when an event occurs with regard to the identified individual, wherein the displayed tag has a first color when the identified individual is detected talking during a video conference and the displayed tag has a second color when the identified individual is detected not talking during the video conference; wherein the first color is different from the second color; and the event being a change in the detected talking state of the identified individual;
determine whether a plurality of individuals are speaking at a same time during the video conference; and in response to determining whether the plurality of individuals are speaking at the same time, change the tags of the plurality of individuals to a same color.

19. The apparatus of claim 18, wherein unauthorized individuals are identified by a special tag.

* * * * *